June 27, 1933.  H. BAX  1,915,281
MACHINE FOR FORMING MESH WIRES
Filed Aug. 23, 1932
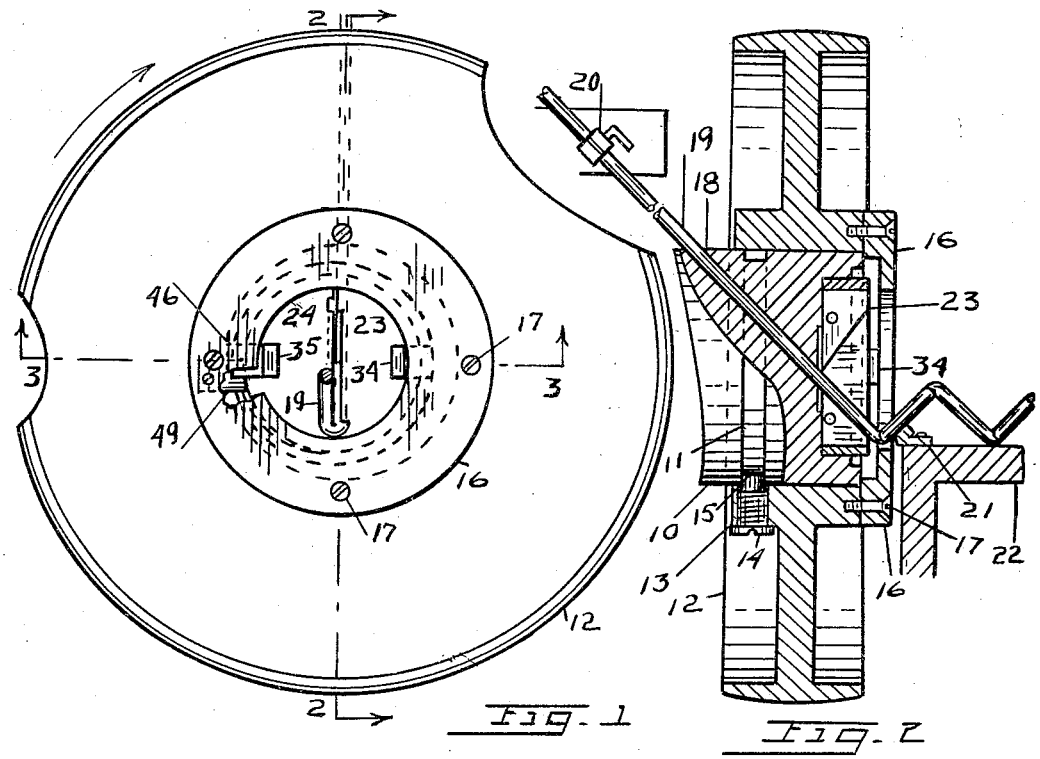
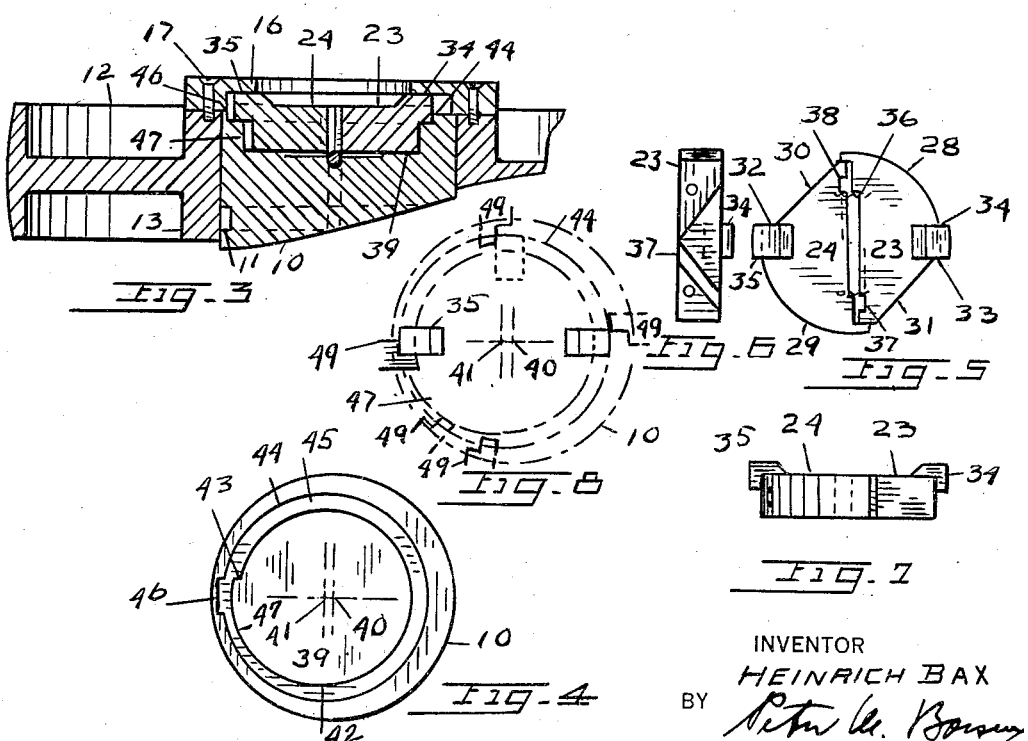
INVENTOR
HEINRICH BAX
BY
ATTORNEY Patented June 27, 1933

1,915,281

UNITED STATES PATENT OFFICE

HEINRICH BAX, OF BROOKLYN, NEW YORK

MACHINE FOR FORMING MESH WIRES

Application filed August 23, 1932. Serial No. 630,005.

This invention relates to a forming machine for mesh wire, and more particularly to a mechanism for making the angular bends in a wire required for interlocking with other similar wires to produce the said mesh. Its principal object is to provide a means adapted for alternately gripping and releasing a wire fed into the machine at an angle to the axis of a rotatable clamping device, and when in closed position, to bend a portion of the wire in a transverse arc movement and to release the said portion at a specific point in the rotation of the said clamping device.

A further object is to provide means to form the angular bends so that each bent portion is offset with respect to the bent portions adjacent thereto.

Another object is to provide a machine which is automatic in action and adapted to complete all of the required forming movements without the necessity of secondary operations or mechanism.

Wires of any desired length or diameter may be manipulated and the mesh size varied as desired, and the resultant product will be uniform in structure and present an even surface without crude and irregular portions such as are frequently found in ordinary material of this character.

The foregoing and other objects and features of the invention are fully described in the following specification and claims, and illustrated in the accompanying drawing, in which:

Fig. 1 is a face view of the mechanism.

Fig. 2 is a section on the line 2—2 of Figure 1.

Fig. 3 is a fragmentary section on the line 3—3 of Figure 1.

Fig. 4 shows the front end of the stationary stud on which the forming mechanism revolves.

Fig. 5 is a face view of the right and left clamp elements.

Fig. 6 is an edgewise view of the right hand clamp element shown in Figure 5.

Fig. 7 is a view of the clamp elements assembly of Figure 5 turned into a horizontal position.

Fig. 8 is a diagram showing the action of the driving lug in its several stages of movement with respect to the wing lugs of the clamp elements.

Referring first to Figure 2 of the drawing; a stationary stud 10 has a circumferential groove 11. A drive pulley 12 has its hub 13 rotatably mounted on the said stud. A screw 14 has a smooth tip 15 which runs in the groove 11 and maintains the drive pulley on the main stud 10. A retainer ring 16 is secured firmly to the hub 13 by the screws 17.

A hole 18 runs diagonally through the stud 10 and wire as shown at 19 is fed through the said hole by means of the movable pusher clamp 20. As the wire is bent by swinging in an arc about the axis of the stud 10, its successive bent portions engage and stop on the element 21 over the guide frame 22. The wire is gripped at each successive step between the right clamp element 23 seen in this view and the left clamp element 24 shown in Figure 1.

The clamp elements 23 and 24 are illustrated in Figures 5, 6 and 7 and are constructed as follows: When in closed position their combined peripheries 28 and 29 are concentric to a common center, and on opposite sides they are cut away as shown at 30 and 31 to leave small shoulders 32 and 33, at the sides of the wing lugs 34 and 35. Expansion springs 36 push the elements apart when their position in the stud 10 permits of this movement. The contact faces of the elements are diagonally grooved as shown at 37 and 38. These grooves come alternately into line with the hole 18 of the main stud 10.

The wing lugs 34 and 35 of the clamp elements extend outwardly from the edges thereof as shown. It will be observed that the grooves 37 and 38 are at the right and left of the center line of the assembly; this is for the purpose of giving the required offset to the bent portions.

The face end of the stationary stud 10 is shown in Figure 4. The stud center is at 40 and the center of the clamp socket 39 is at 41. Thus the socket recess is eccentric to the axis of the stud. A flare 47 in the circle of the socket occurs from the third quarter 42 to the shoulder 43. The stud is countersunk at 44 to leave the shoulder 45, and a stop notch 46 extends outwardly from the countersunk portion and in line with the stop shoulder 43.

The assembly of the clamp elements in the stud is shown in Figure 3 and it will be seen that they set down in the socket 39 with the wing lugs 34 and 35 in the countersunk portion 44. The retainer ring 16 rests on the tops of the wing lugs.

Referring now to Figure 1; a drive lug 49 is affixed to the retainer ring 16 and is adapted to strike the wing lug 34 or 35 when the same is on that side of the stud and to move it around in a half rotation to the opposite side, where the said drive lug 49 slips off contact with the wing lug by reason of the eccentricity of the clamp assembly with respect to the center of the stationary stud 10.

At the start of this movement, a wing lug, say 35, is on the left side and is free of the stop notch 46 and is closed to its grip position on the wire 19; the drive lug 49 actuated by the pulley 12 now forces the wing lug 35 in clockwise rotation as illustrated in the diagram in Figure 8.

Referring now to the diagram; at the first quarter the drive lug 49 will have moved outward on the eccentric to a half contact on the wing lug; at the half way point, or right side of the movement the eccentric action will cause it to slip clear of the wing lug and pass on freely. The movement of the clamps will now cease and they will remain stationary until the drive lug 49 again reaches the starting point at left of the assembly. The foregoing movement will have brought the lug 34 and the clamp element 23 around to the left side and when the said element reached the outflare 47 it would have opened by pressure of the springs 36, and the wing lug 34 would slip into the notch 46 and its shoulder would rest against the stop element 43. The clamp now being open; the wire 19 slips forward to a new position. The clamp is closed by the sliding contact of the drive lug 49 on the rim of the said clamp which it gradually forces over, and this finally results in clearing the element from the notch 46 and the shoulder 43 and it is ready for a new movement when the drive lug strikes the wing lug as before.

The action therefor is as follows: The wire is fed through the open clamp to the stop 21; the clamp is closed by pressure of the drive lug 49; a one half turn bends the wire over and offsets it and carries the bent portion to its final position; the clamp ceases rotation for a half turn of the drive and opens in the flare 47 to let the wire through for the next operation, and the cycle of movements is then as before.

While the mechanism is shown and described in its preferred form, it is not limited in minor details to this exact construction, but is to be broadly construed within the limits and scope of the appended claims.

Having thus described my invention, what I claim as new and desire to secure by Letters Patent of the United States, is as follows:

1. In a wire forming machine, a stationary element provided with a hole therethrough at an angle crossing the axis of the said stationary element, rotatable clamping members adapted to grip a portion of a wire fed through the said hole, and means to turn the clamping members and the gripped portion of the wire to a specific point of rotation.

2. In a wire forming machine, a stationary stud, clamp members eccentrically mounted in the end thereof, the said stud being formed with a hole passing diagonally through the latter and across the axis thereof, and means to close the clamp members to grip a wire fed through the hole, and means to swing the clamp assembly in the arc of a circle and to bend that portion of the wire which is gripped within the said assembly.

3. In a wire forming machine, a stationary stud provided with a hole passing therethrough, a clamp assembly eccentrically mounted in the end of the said stud and adapted to receive successively portions of a wire fed through the said hole and to grip the same; rotatable means mounted on the said stud and acting upon the said assembly to swing the same in a partial rotation, and means to open the said clamp assembly for the passage of a portion of the said wire into a new position.

4. In a machine of the character described, a stationary stud, a rotatable element mounted thereon, a split clamp eccentrically mounted at the end of the said stud and adapted to be opened and closed during its rotation in the said stud by means of a drive member affixed to the said rotatable element and adapted to swing around the true axis of the stud and to strike a projection on the split clamp and to push the same for one half the rotation, and to release the said clamp at that point by reason of the eccentricity of the clamp due to its axis being off center with respect to the said stud, the latter being formed with a diagonal feeding hole passing across the axis thereof and in position to carry a wire into the aforesaid split clamp.

5. In a machine of the character described, a stationary stud, a diagonal feed means passing through the same, a split clamp eccentrically mounted in the end of the said stud and in line to receive a wire fed through the aforesaid stud, and means to open and to close the said split clamp, and means to swing the same in successive half steps in arcs transverse to the axis of the said stud.

Signed at New York city, in the county of New York and State of New York, this 9th day of August, A. D. 1932.

HEINRICH BAX.